United States Patent [19]

Higgins

[11] 4,345,139
[45] Aug. 17, 1982

[54] CONSTANT CURRENT SCR POWER SUPPLY METHOD AND SYSTEM FOR A WELDING LOAD

[75] Inventor: Philip K. Higgins, Florence, S.C.
[73] Assignee: Union Carbide Corporation, Danbury, Conn.
[21] Appl. No.: 221,507
[22] Filed: Dec. 30, 1980
[51] Int. Cl.³ ............................................... B23K 9/10
[52] U.S. Cl. ........................ 219/137 PS; 219/130.32; 323/246
[58] Field of Search ...................... 219/130.32, 130.33, 219/137 PS; 323/237, 246

[56] References Cited
U.S. PATENT DOCUMENTS
3,530,359  9/1970  Grist ............................. 219/130.32
3,723,854  3/1973  Kita .................................... 323/246

Primary Examiner—C. C. Shaw
Attorney, Agent, or Firm—E. Lieberstein

[57] ABSTRACT

A regulated constant current is supplied to a welding load by an SCR power supply having an SCR rectifier network interposed in series between the welding load and applied input power with the SCR power supply comprising means for generating a first feedback signal proportional to arc current which substantially coincides in time and phase with the arc current; means for generating a second feedback signal proportional to arc current which is substantially nonresponsive to the arc current fundamental ripple frequency, means for weighing the first and second feedback signals in a predetermined proportion to establish an error feedback control signal and means for applying trigger signals to the SCR rectifier network in timed synchronism with the input AC power line as a function of the error feedback control signal.

8 Claims, 4 Drawing Figures

CONSTANT CURRENT SCR POWER SUPPLY METHOD AND SYSTEM FOR A WELDING LOAD

This invention relates to the field of SCR power supplies and more particularly to an SCR power supply system and method for regulating the supply of DC current to a non-linear load such as is characteristic of a welding load. For purposes of the present invention the term "welding" is intended to encompass welding processes and plasma processes particularly plasma cutting.

A welding load includes an arc, generated by an electrical discharge between an electrode and workpiece, having an intrinsically non-linear volt ampere characteristic. To maintain a stable arc, power is supplied to the arc by a power supply system in either a constant current or constant voltage mode with the former being preferable for many welding applications. To regulate the flow of current in the constant current mode, a control signal, proportional to the arc welding current, is fed back from the arc to the welding power supply to adjust the level of current flow in response to variation in the feedback control signal. This type of feedback is conventional and provides a satisfactory response characteristic for linear loads. However, with a welding load which is non-linear this type of feedback has not proved entirely satisfactory when power is to be supplied by a silicon controlled rectifier (SCR) type power supply system.

In a welding or cutting system employing an SCR power supply, the solid state SCR devices are directly interposed in a series circuit relationship with the welding load for providing DC current to the arc. In the constant current mode of operation the arc current is regulated by adjustment of the firing angle of the SCR's in response to variations at the load. An adjustment in the firing angle adjusts the power supply output voltage which causes a directly related change in output current. Where the proportionality factor between current and voltage is constant, as is the case with a resistive load, the current response to a voltage adjustment is linear. However, due to the non linear behavior of an arc the proportionality factor between current and voltage is not constant. Accordingly, a current feedback signal corresponding to a detected transient perturbation in the arc will cause a firing angle adjustment which, in turn, may cause an overshoot of undershoot in arc current substantially out of proportion to the feedback signal variation. Instead of regulating arc current, this condition could cause the arc to become more unstable. Arc instability not only makes it difficult to weld, but in plasma cutting, is a principal cause of double arcing in the torch body causing the torch to deteriorate and breakdown. One way arc instability may be minimized is to insert a very large filter inductor in series with the output of the power supply. The filter inductor will dampen current fluctuations and significantly reduce the ripple factor. However, the physical size required for such a large filter inductor is a substantial drawback and adds very significantly to the cost of the power supply. An alternative approach has been to reduce the magnitude of the control feedback signal and to dampen the feedback network response. This, of course, minimizes the ability to regulate the current flow and renders the power supply system insensitive to transient fluctuations.

The SCR power supply system of the present invention supplies a regulated DC current to a non-linear load such as a welding or cutting arc to assure arc stability while minimizing the size of the filter inductor. Broadly, regulation is accomplished by monitoring the arc to generate a first feedback signal proportional to arc current which substantially coincides in time and phase with the arc current; generating a second feedback signal proportional to arc current; passing the second feedback signal through a filter network having a relatively long time constant such that the second feedback signal is rendered substantially nonresponsive to the fundamental ripple frequency; weighing the first and second feedback signals in a predetermined ratio relative to one another; generating a single feedback control signal representing the weighted output of said first and second feedback signals and controlling the firing of the SCR devices in the power supply in response to the feedback control signal.

Accordingly, it is an object of the present invention to provide an SCR power supply system and method for regulating the current flow to a welding load.

It is a further object of the present invention to provide an SCR power supply system and method of regulating the supply of DC current to a welding arc in response to arc fluctuations occurring within the fundamental ripple period as well as to varying arc fluctuations occurring over long time periods.

Further objects and advantages of the present invention will become apparent from the following detailed description of the invention when read in conjunction with the accompanying drawings of which:

Figure 1:
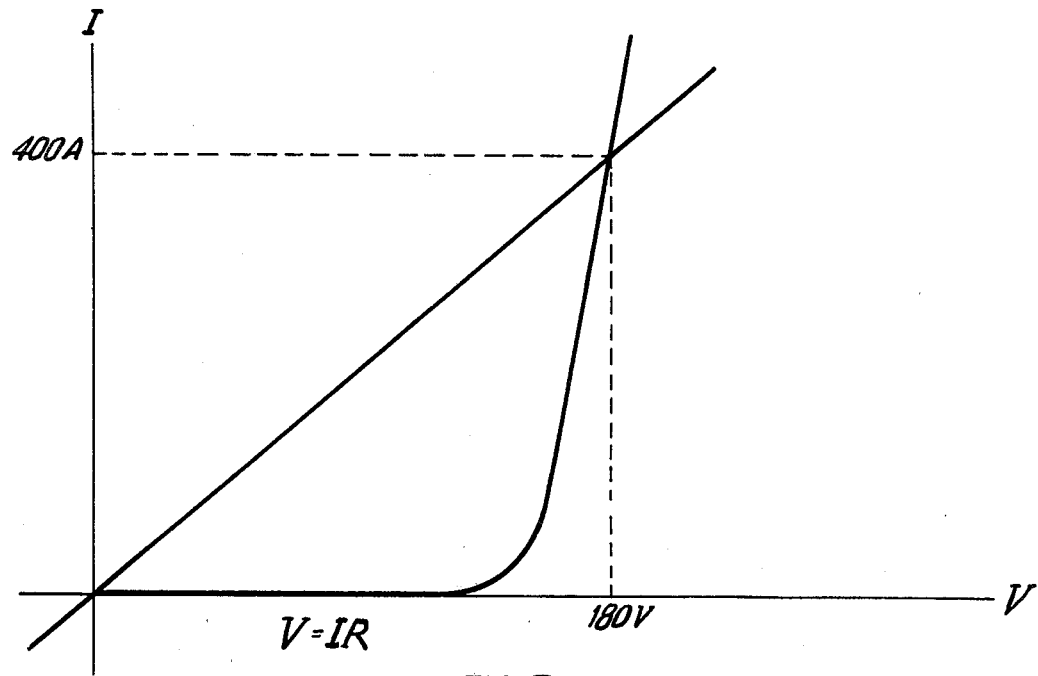
FIG. 1 illustrates a typical volt ampere characteristic of a plasma cutting arc.

Referring now in particular to FIG. 1 of the drawings which illustrate the non-linear volt ampere characteristic of a plasma cutting arc. An exemplary static load line is shown intersecting the volt ampere curve to provide a typical operating arc voltage and arc current. Dynamically it is extremely difficult to predict the instantaneous affect on current due to an adjustment in voltage since the curve itself may shift.

Figure 3:
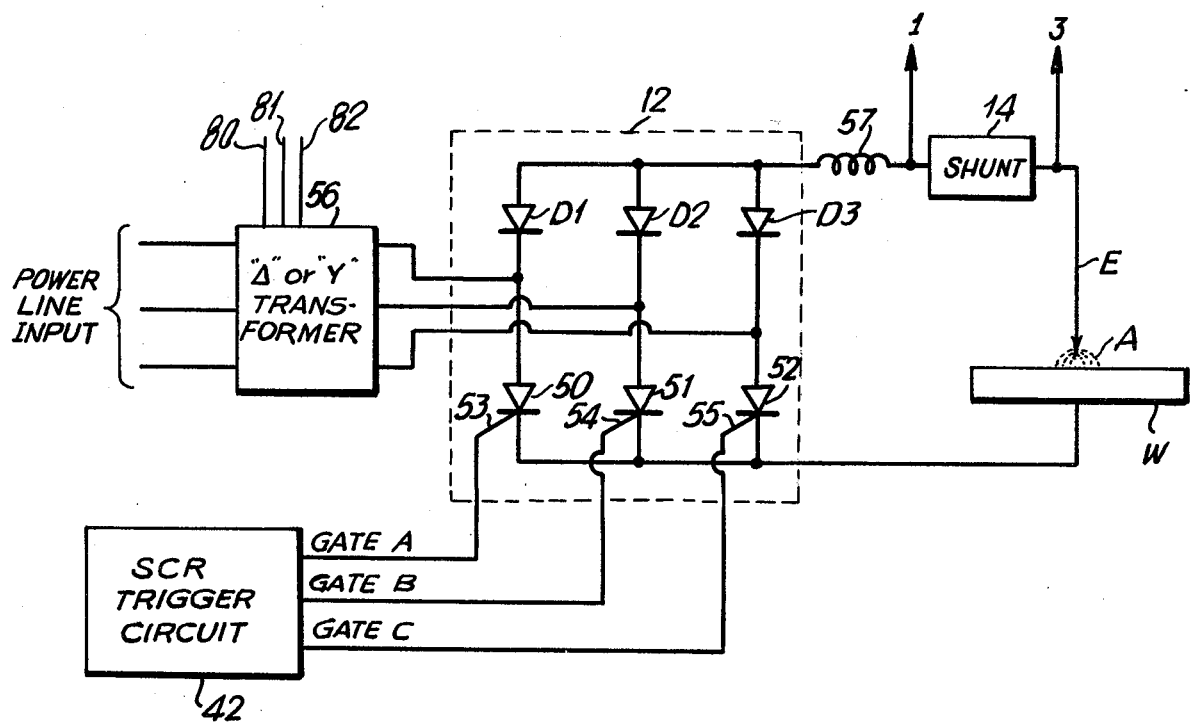
FIG. 3 is a composite block and schematic diagram of the power SCR bridge network of FIG. 2 for regulating a source of applied input power in combination with a typical welding load.
Figure 2:
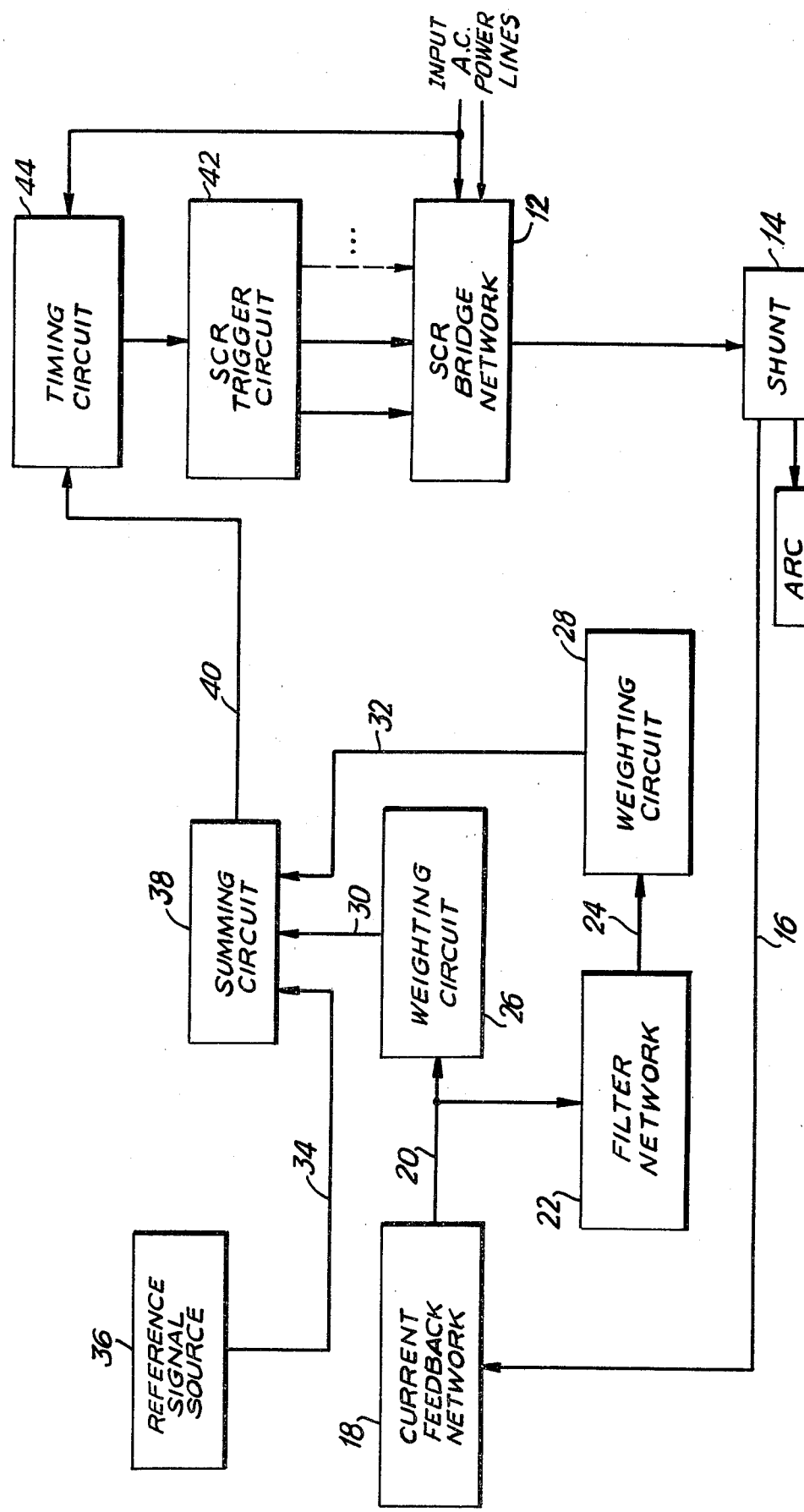
FIG. 2 is a block diagram of the stabilized SCR arc power supply system of the present invention.

The block diagram for the welding power supply system of the present invention is shown in FIGS. 2 and 3 with FIG. 3 illustrating the circuit relationship between the applied input power, the SCR rectifier network 12 and a typical welding load represented by an arc A which is generated between an electrode E and workpiece W, in a conventional manner. The arc welding current is regulated by the SCR rectifier network 12 which may be arranged in any conventional configuration with the bridge configuration as illustrated being preferred.

The arc A is monitored as shown in FIG. 2 using a shunt 14 which is placed in series with the output of the SCR rectifier network 12 to provide a feedback signal 16 proportional to arc current. The feedback signal 16 is amplified in a current feedback network 18 for generating a first predetermined feedback signal 20 which responds relatively instantaneously to the arc current. The feedback signal 20 is passed through a filter network 22 to generate a second feedback signal 24 which is substantially nonresponsive to the fundamental ripple frequency of the arc current. Although the second feedback signal 24 is derived from the first feedback signal 20 it should be apparent that they may be independently generated as separate current feedback error signals responsive to arc current.

The feedback signals 20 and 24 are weighted relative to the total feedback signal representing the sum of the outputs 30 and 32 of the weighting circuits 26 and 28 respectively. The weighted signal 30 is generated from the first feedback signal 20 and the weighted signal 32 from the second feedback signal 24. The weighted signals 30 and 32 bear a critical relationship to one another with the weighted signal 30 having an amplitude of no less than about 10% and no greater than about 50% of the amplitude of the total feedback signal 30 plus 32. Preferably the weighting circuit 26 should produce a weighted signal 30 in a range of about 15 to 25% of the total feedback signal 30 plus 32, whereas the weighting circuit 28 should produce a weighted signal 32 in a range of about 75 to 85% of the total feedback signal 30 plus 32. The two weighted signals 30 and 32 are summed together with an adjustable reference signal 34, generated from the reference signal source 36, in the summing circuit 38 to provide an error feedback control signal 40 which is fed to a timing circuit 44 for controlling an SCR trigger circuit 42. The SCR trigger circuit 42 fires each SCR in the power SCR bridge network 12 in synchronism with the AC power line input. The timing circuit 44 controls the timed synchronization between the SCR trigger circuit 42 with the input AC power line as a function of the feedback error signal.

The preferred circuit arrangement for the SCR bridge network 12 is shown in FIG. 3 represented by a half converted three phase full wave bridge rectifier comprising three SCR's 50, 51, 52 and three diodes D1, D2 and D3. The three SCR's have corresponding control gates 53, 54 and 55 respectively. Power is supplied to the SCR bridge network 12 from a three phase power line input through a transformer 56 which may be arranged in a delta or wye configuration. A filter inductor 57 is interposed in series circuit relationship between the welding load and the output of the power SCR bridge network 12. The filter inductor 57 need only be of relatively small magnitude, for example, between about one to 6 millihenry; where the inductor would have to be typically two or more times this inductance to stabilize the arc without the system of the present invention.

Figure 4:
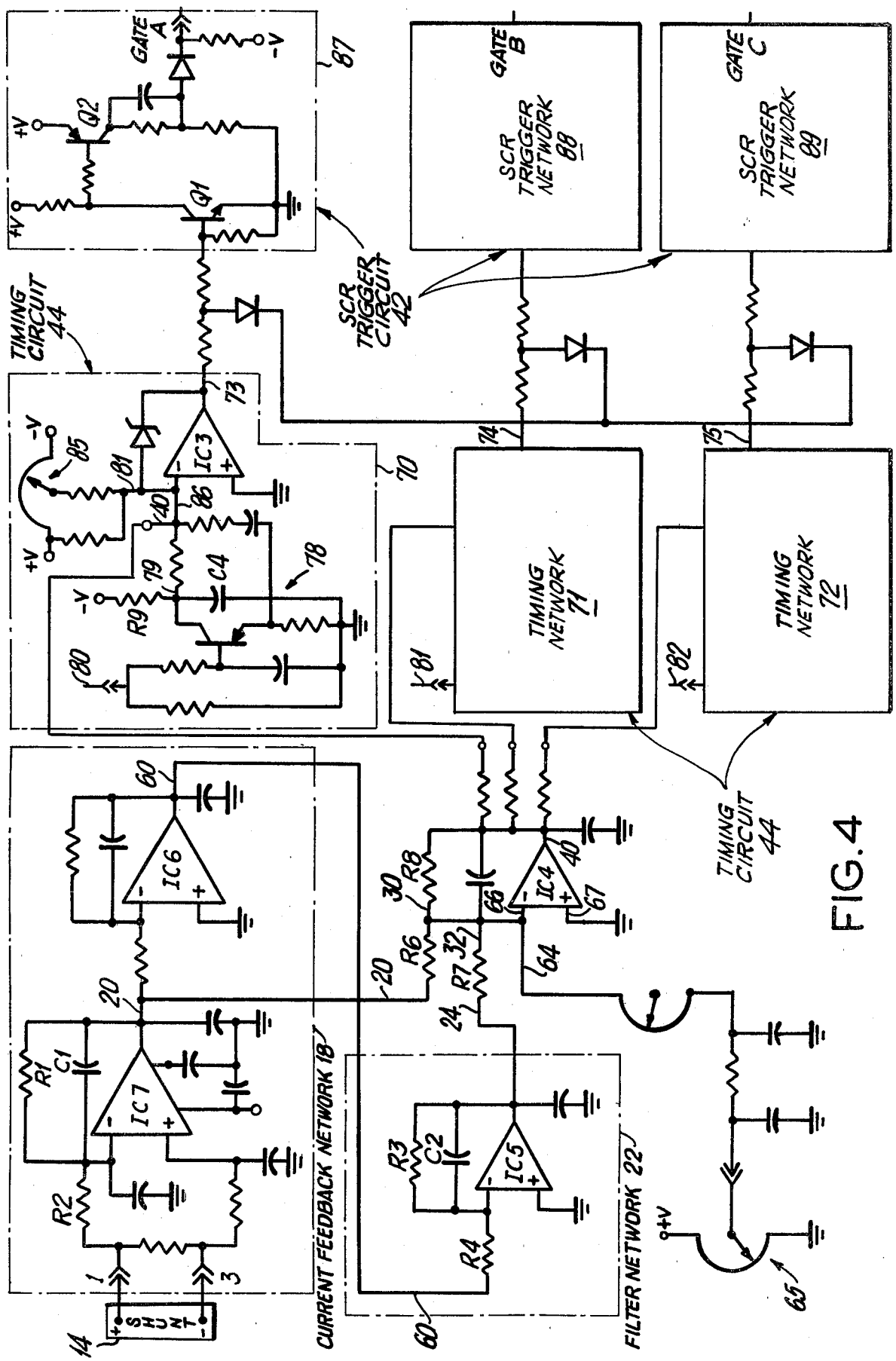
FIG. 4 is a schematic circuit diagram of the stabilized SCR arc power supply system corresponding to the block diagram of FIG. 2.

The preferred circuitry for practicing the invention as embodied in the functional block diagram of FIG. 2 is shown in FIG. 4. The shunt 14 is a resistor selected to produce an arc current feedback signal 16 having a magnitude in the millivolt range which will be proportional to arc current. This signal is amplified by the operational current amplifier IC7 in the arc current feedback network 18. The arc current feedback network 18 also provides noise filtering through the combination of resistors R1 and R2 and capacitor C1. The noise filtering should not impose any significant time delay on the arc current feedback signal 18. The time constant of the current feedback network 18 should be of the order of about one (1) ms or less such that the first feedback signal 20 generated by the current feedback network 18 will substantially coincide in time and phase with the arc current feedback signal 16 across input leads 1 and 3.

The first feedback signal 20 is passed through an inverter IC6 to form an inverted input signal 60 which is applied to the filter network 22. The filter network 22 consists of an operational amplifier IC5 and a filter circuit including resistors R3 and R4 and capacitor C2. The filter network 22 operates to reinvert, integrate, average and substantially delay the inverted input signal 60 to produce a second feedback signal 24 which is substantially nonresponsive to the arc current ripple frequency. To provide this function the filter network 22 should have a long time constant from about 5 to 50 times the period of the fundamental arc current riple. A time constant of about 100 ms has been found to be suitable.

The first and second feedback signals 20 and 24 are separately applied to the weighting circuits 26 and 28 to form the weighted feedback signals 30 and 32 respectively. The weighted feedback signals 30 and 32 are applied as inputs to the negative terminal 66 of summing amplifier IC4 in common with a DC reference signal input 64. An adjustable potentiometer 65 permits adjustment of the DC magnitude of the reference signal 64. The positive terminal 67 of the summing amplifier IC4 is grounded. The weighting circuit 26 of FIG. 2 is represented by the ratio of resistor R8 to resistor R6 and defines a first predetermined gain for the summing amplifier IC4. The weighting circuit 28 of FIG. 2 is represented by the ratio of resistor R8 to resistor R7 and defines a second predetermined gain for the summing amplifier IC4. The summing amplifier IC4 in combination with resistors R6, R7 and R8 comprise the summing circuit 38 of FIG. 2. The summing amplifier IC4 generates the error feedback control signal 40 in response to the arithmetic addition of the weighted negative feedback signals 30 and 32 and the positive reference signal input 64. The error feedback control signal 40 is applied to a timing circuit 44 for controlling the energizing of the SCR bridge network 12 through the SCR trigger circuit 42. Optimum regulation is attained with a self stabilized constant welding current when the weighted feedback signal 30 is about 15 to 25% of the total feedback signal 30 plus 32.

The SCR timing circuit 44 is composed of three identical circuit networks 70, 71, and 72 for generating timing signals 73, 74 and 75 for each phase of the three input power line phases. Since the networks 70, 71 and 72 are equivalent to one another, the detailed circuit schematic of network 70 was selected for illustration in FIG. 4 with the corresponding networks 71 and 72 shown only in block form. The circuit network 70 comprises an oscillating ramp generator 78 which generates an output ramp signal 79 tied in frequency and time to the applied line voltage through signal input lead 80. The signal input lead 80 is connected back to a timing winding (not shown) in the transformer 56 of the block diagram of FIG. 3. The timing winding provides a synchronizing signal voltage in the same phase relationship with the main transformer winding of transformer 56 as is well known in the art. The input signal on lead 80 assures a forced ramp oscillation at a repetition rate equal to and in phase with the applied line signal voltage. The slope of the ramp signal 79 is determined by the RC time constant represented by resistor R9 and capacitor C4. The output ramp signal 79 is combined with the feedback control signal 40 and with a manually adjustable DC offset adjustment signal 84, from an adjustable potentiometer 85, for forming an input signal 86 on the negative terminal of operational amplifier IC3.

The positive terminal of the operational amplifier IC3 is connected to common ground. The operational amplifier IC3 operates as a comparator for providing a saturated output signal voltage 73 which reverses polarity to form a square wave output at the pulse repetition rate of the output ramp signal 79. The cross over in output polarity is controlled by the input signal phase change as determined from the combination of the ramp signal 79, and the error feedback control signal 40 and the DC signal 84. The effect of the error feedback control signal 40 and the DC signal 84 on the ramp signal 79 is to adjust the point of cross over from a negative to a positive voltage. The circuit networks 71 and 72 will generate similar timing signal outputs 74 and 75 at a corresponding pulse repetition rate with their phase positions being adjustable by manually adjustable potentiometers (not shown) equivalent to potentiometer 85 in circuit network 70.

The output timing signals 73, 74 and 75 are applied to the SCR trigger circuit 42 for generating the trigger gate pulses A, B and C which fire the control gates 53, 54 and 55 of the SCR's 50, 51 and 52 respectively. The SCR trigger circuit 42 includes three identical circuit networks 87, 88 and 89 of which network 87 is shown for illustration purposes. It should be noted that the number of circuit networks for the timing circuit 44 and the SCR trigger circuit 42 is dependent upon the number of power line phases and upon the configuration of the SCR bridge network used. The circuit network 87 of the SCR trigger circuit 42 includes a current amplifier complementery transistor arrangement represented by transistors Q1 and Q2. The gate pulses A, B and C from the trigger circuit 42 are coincident in time with the timing signals 73, 74 and 75, respectively.

What is claimed is:

1. An SCR power supply for supplying regulated constant current to a load in which an arc is established between an electrode and workpiece comprising an SCR rectifier network interposed in series circuit relationship between said load and an input AC power line having a predetermined number of input phases with said SCR rectifier network having at least as many SCR elements as power line input phases; means for generating a first feedback signal proportional to arc current and substantially coinciding in time and phase with the arc current; means for generating a second feedback signal proportional to arc current with said second feedback signal being substantially delayed in time such that it is rendered substantially nonresponsive to the arc current fundamental ripple frequency; means for weighing said first and second feedback signals in a predetermined ratio to one another so as to produce a first and second weighted signal with the first weighted signal having an amplitude of between 10–50% of the total of said first and second weighted signals; means for generating an error feedback control in response to the summation of said first and second weighted signals and means for applying trigger signals to said SCR elements in timed synchronism with said input AC power line as a function of said error feedback control signal.

2. An SCR power supply as defined in claim 1 wherein said first weighted signal has an amplitude of between 15 to 25% of the total feedback signal represented by the addition of said first and second weighted signals and wherein said second weighted signal has an amplitude of between 75 to 85% of said total feedback signal.

3. An SCR power supply as defined in claim 2 wherein said second feedback signal is generated from said first feedback signal.

4. An SCR power supply as defined in claim 3 wherein said means for generating said second feedback signal is a filter network having a relatively long time constant of from about 5 to 10 times the period of the fundamental arc current ripple.

5. An SCR power supply as defined in claim 4 wherein said means for triggering said SCR elements comprises a ramp oscillator for generating a ramp oscillating signal having a period of oscillation proportional to the frequency of said input AC power line, DC reference signal means for generating a reference offset DC signal; means for generating output trigger pulses having an output polarity which reverses at said oscillating ramp frequency with each reversal in polarity being controlled in response to said error feedback control signal.

6. An SCR power supply as defined in claim 5 wherein said means for weighing said first and second feedback signals comprises a plurality of resistors arranged to provide a predetermined gain ratio relative to one another.

7. An SCR power supply as defined in claim 6 wherein said SCR rectifier network comprises a half converted full wave bridge rectifier including in combination an equal number of SCR elements and diodes.

8. A method for regulating the flow of constant current from an input AC power line to an arc by an SCR power supply interposed in series between the arc and the AC power line comprising the steps of: monitoring the arc to detect arc current perturbations; generating a first feedback signal proportional to arc current which substantially coincides in time and phase with the arc current; generating a second feedback signal proportional to arc current; passing the second feedback signal through a filter network having a relatively long time constant such that the second feedback signal, is rendered substantially nonresponsive to the arc current fundamental ripple frequency; weighing the first and second feedback signals in a predetermined ratio relative to one another; generating an error feedback control signal representing the weighted output of said first and second feedback signals and controlling the firing of said SCR power supply in timed synchronism with the input AC power line as a function of said error feedback control signal.

* * * * *